(12) United States Patent
Goffin et al.

(10) Patent No.: US 7,941,317 B1
(45) Date of Patent: *May 10, 2011

(54) LOW LATENCY REAL-TIME SPEECH TRANSCRIPTION

(75) Inventors: Vincent Goffin, Summit, NJ (US); Michael Dennis Riley, New York, NY (US); Murat Saraclar, Jersey City, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/758,037

(22) Filed: Jun. 5, 2007

Related U.S. Application Data

(63) Continuation of application No. 10/301,097, filed on Nov. 21, 2002.

(60) Provisional application No. 60/411,553, filed on Sep. 18, 2002.

(51) Int. Cl.
*G10L 15/02* (2006.01)
*G10L 15/04* (2006.01)
*G10L 15/14* (2006.01)

(52) U.S. Cl. .......... 704/256.7; 704/256.4; 704/231; 704/251; 704/236; 704/240; 704/257

(58) Field of Classification Search .......... 704/231, 704/236, 251, 257, 256.7, 256.4, 240; 74/251, 74/257, 231, 236
See application file for complete search history.

(56) References Cited

U.S. PATENT DOCUMENTS

| | | | | |
|---|---|---|---|---|
| 5,758,024 A | * | 5/1998 | Alleva | 704/254 |
| 5,787,230 A | * | 7/1998 | Lee | 704/235 |
| 5,995,561 A | * | 11/1999 | Yamasaki et al. | 375/341 |
| 6,490,553 B2 | | 12/2002 | Van Thong et al. | |
| 6,507,815 B1 | * | 1/2003 | Yamamoto | 704/231 |
| 6,539,351 B1 | | 3/2003 | Chen et al. | |
| 6,609,093 B1 | * | 8/2003 | Gopinath et al. | 704/236 |
| 6,785,645 B2 | * | 8/2004 | Khalil et al. | 704/216 |
| 6,944,588 B2 | | 9/2005 | Kempe | |
| 6,952,667 B2 | | 10/2005 | Kempe | |
| 6,957,184 B2 | | 10/2005 | Schmid et al. | |
| 6,959,273 B2 | | 10/2005 | Kempe | |
| 6,961,693 B2 | | 11/2005 | Kempe | |
| 7,007,001 B2 | * | 2/2006 | Oliver et al. | 706/21 |
| 7,454,341 B1 | * | 11/2008 | Pan et al. | 704/256 |
| 2003/0009335 A1 | | 1/2003 | Schalkwyk et al. | |
| 2003/0061458 A1 | * | 3/2003 | Wilcox et al. | 711/167 |
| 2003/0139926 A1 | | 7/2003 | Jia et al. | |

OTHER PUBLICATIONS

N. Kumar et al., "Heteroscedastic Discriminant Analysis and Reduced Rank HMMs for Improved Speech Recognition", Speech Communication, vol. 26, pp. 283-297, 1998.

G. Soan et al., "Maximum Likelihood Discriminant Feature Spaces", in Proc. ICASSP, pp. 1129-1132, 2000.

(Continued)

*Primary Examiner* — James S Wozniak
*Assistant Examiner* — Abdelali Serrou

(57) ABSTRACT

Systems and methods for low-latency real-time speech recognition/transcription. A discriminative feature extraction, such as a heteroscedastic discriminant analysis transform, in combination with a maximum likelihood linear transform is applied during front-end processing of a digital speech signal. The extracted features reduce the word error rate. A discriminative acoustic model is applied by generating state-level lattices using Maximum Mutual Information Estimation. Recognition networks of language models are replaced by their closure. Latency is reduced by eliminating segmentation such that a number of words/sentences can be recognized as a single utterance. Latency is further reduced by performing front-end normalization in a causal fashion.

12 Claims, 3 Drawing Sheets

OTHER PUBLICATIONS

G. Cook et al., "Real-Time Recognition of Broadcast Radio Speech", in Proc. ICASSP, pp. 141-144, 1996.

J. Glass et al., "Realtime Telephone-based Speech Recognition in the Jupiter Domain", in Proc. ICASSP, pp. 61-64, 1999.

M.J.F. Gales, "Maximum Likelihood Linear Transformations for HMM-based Speech Recognition". Tech. Rep. CUED/FINFENG//TR291, Cambridge University, 1997.

M. Siegler et al., "Automatic Segmentation and Clustering of Broadcast News Audio". in Proc. DARPA Speech Recognition Workshop, pp. 97-99, 1997. Code available at http://www.nist.gov/speech/tols/CMUseg_05targz.htm.

M. Mohri et al., "Integrated Context-Dependent Networks in Very Large Vocabulary Speech Recognition", in Proc. Eurospeech, 1999.

M. Mohri et al., "Weighted Finite-State Transducers in Speech Recognition", in Proc. ISCA ITRW ASR 2000, 2000.

M. Mohri et al., "A Weight Pushing Algorithm for Large Vocabulary Speech Recognition", a Proc. Eurospeech, 2001.

R.A. Gopinath, "Maximum Likelihood Modeling with Gaussian Distributions for Classifications", in Proc. ICASSP, 1998, pp. 661-664.

* cited by examiner

LOW LATENCY REAL-TIME SPEECH TRANSCRIPTION

CROSS-REFERENCE TO RELATED APPLICATIONS

This application is division of U.S. patent application Ser. No. 10/301,097, filed Nov. 21, 2002, which claims the benefit of U.S. Provisional Patent Application Ser. No. 60/411,553 entitled "Low Latency Real-Time Speech Transcription" and filed Sep. 18, 2002, which are incorporated herein by reference in their entirety.

BACKGROUND OF THE INVENTION

1. The Field of the Invention

The present invention relates to systems and methods for transcribing speech. More particularly, the present invention relates to systems and methods for recognizing or transcribing very large vocabulary speech in real-time.

2. The Relevant Technology

Closed captioning is a technology used in video or television programming that displays a text equivalent of the speech spoken during the video or television programming on a monitor such as a television screen. By displaying text, closed captioning permits a television program to be understood in situations where the audio cannot be heard. For example, noisy environments such as airports often enable closed captioning because of the difficulty in hearing the program. Closed captioning is also useful for individuals who are hearing impaired.

The closed captioning text is usually included in the video signal and is typically decoded and displayed to users concurrently with the television program or other video. For many television programs, the speech is known in advance and it is relatively easy to generate the text that corresponds to that speech and encode the text in the video signal. Many television programs, for example, are taped before they are broadcast. In this situation, the speech included in the television programs can be converted to text and inserted in the television program before it is aired. Preparing the closed captioning text is not subject, in this situation, to any stringent time restraints.

However, there are many situations where the speech is not known in advance and it is much more difficult to provide closed captioning in these situations. Broadcast news programs, for example, suffer from this problem. Broadcast news programs are often broadcast live and the speech of the broadcasters is therefore not usually known beforehand. The speech must be transcribed as it is spoken before it can be inserted in the video signal and displayed to end users using closed captioning technology. Because of these time constraints, closed captioning text frequently includes errors and there is often a delay between the speech and the corresponding transcribed text.

Sometimes, transcribing the speech to closed captioning text is performed by humans. Alternatively, automatic speech recognition (ASR) systems are used to aid or perform the speech transcription. One goal of these ASR systems is to transcribe the speech in real-time. This is a formidable task for a variety of reasons. For example, each broadcaster has a different voice and training an ASR recognition system with a large number of different voices is time consuming. Another factor that makes real-time speech transcription difficult is that the speech included in broadcast news programs has a very large vocabulary. These and other factors combine to make real-time speech transcription difficult to achieve. Those systems that have achieved real-time transcription typically have unacceptable error rates or other latency problems not directly related to the speech transcription.

For these reasons, a considerable amount of research has recently been performed in Broadcast News Transcription and the DARPA Hub 4 evaluations are examples of this research. The hub systems, however, were developed to maximize accuracy and usually run in excess of 100 times real-time (100×RT). A 100×RT system requires 100 seconds to process or transcribe 1 second of speech. There are also 10×RT systems that can run faster than 10×RT with small degradations in accuracy.

As transcription systems using ASR approach real-time operation, the accuracy begins to degrade and word error rates increase. There is therefore a large margin for improvement in real-time speech transcription. In fact, much progress needs to be made before automatic speech recognition systems can replace humans for real-time closed captioning, where the human error rate is approximately 10%.

Another problem that impacts the ability of a transcription system to transcribe speech in real-time is latency. Latency is often defined as the delay between the input and output of the speech recognition system. Thus, real-time performance of speech recognition does not guarantee low latency. For instance, a speech recognition system may have a preprocessing component that operates on the whole input. In this case, the latency is related to the length of the input, regardless of how fast the speech recognition system can transcribe the speech.

In another instance, latency can be introduced by segmentation of the speech being recognized and transcribed. A segmenter, for example, generates small segments that are fed to a front-end. If a segmenter operates on an entire show, then the latency is the length of the show. Often, segmenters use a distance metric between two adjacent speech windows. In this case, the latency is at least the distance metric between speech windows, which is typically 2 to 4 seconds.

BRIEF SUMMARY OF THE INVENTION

These and other limitations are overcome by the present invention which relates to automatic speech recognition/speech transcription in real-time with reduced latency. Speech transcription is the process that converts speech to text and automatic speech recognition (ASR) is an important aspect of speech transcription. After the speech is recognized, it can be easily and quickly transcribed or reproduced as text.

Speech recognition begins when speech, usually represented as an analog signal, is received by the ASR system. The analog input is converted to a digital signal and the ASR system then proceeds to decode or recognize the speech contained in the digital speech signal. To recognize speech, features or feature vectors are typically extracted from the digital speech signal.

In one embodiment, a series of transforms are performed on the digital speech during front-end processing or feature extraction in order to extract feature vectors as well as to improve the feature vectors that are extracted. For example, a heteroscedastic discriminant analysis (HDA) and a maximum likelihood linear transform (MLLT) are performed during the front-end processing of the digital speech signal. The combination of the HDA and the MLLT reduces the word error rate of the ASR system and ensures minimum loss of likelihood with diagonal covariance.

A discriminative acoustic model is also employed during the recognition stage to improve speech recognition in terms of reducing word error rate and real-time factors. In one embodiment, the discriminative acoustic model is achieved by iteratively performing lattice-based Maximum Mutual Information Estimation (MMIE) on the speech model(s). In this case, state-level lattices are generated at each iteration and the state-level lattices constrain the search. At each iteration, only the means and variances are updated. The discriminative acoustic model can also be improved by computing a likelihood for both the current and future speech frames. This is beneficial because Gaussians needed to compute a likelihood for current and future speech frames are fetched from memory once per batch and takes advantage of the fact that the Gaussians used for a current speech frame will likely be needed in future speech frames due to the continued activation of the corresponding search state.

The latency of the ASR/speech transcription system is reduced by replacing a language model that includes a recognition network with its closure, which permits the recognition of any number of sentences as a single utterance. This prevents silences from being forced at segment boundaries and makes end-pointing unnecessary. In other words, pre-segmentation of the speech or audio input is reduced or eliminated. Memory is also managed in order to prevent memory exhaustion as speech is no longer being recognized in segments. Latency is further reduced by performing causal normalization of the feature vectors during front-end processing.

Additional features and advantages of the invention will be set forth in the description which follows and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Automatic speech recognition (ASR) and/or speech transcription typically begins when speech is received by a speech recognition system. The speech may be received over the telephone or through another type of electronic transducer such as a microphone. The transducer converts the speech into an analog signal which is then converted into a digital signal. After the speech is in a digital form, the speech recognition system attempts to recognize or decode the digital speech signal. The present invention relates to systems and methods for recognizing speech and more specifically to transcribing speech in real-time. An exemplary environment for implementing the present invention is in transcribing news broadcasts or other speech in real-time.

An Exemplary Baseline System

AT&T's TREC-8/SDR99 submission was used as a baseline system. The front-end processing module computes 12 mel-frequency cepstral coefficients and energy, as well as the first and second derivatives, to yield a 39-dimensional vector per frame at a rate of 100 frames per second. For feature normalization, cepstral mean subtraction and maximum value energy normalization are applied to the feature vectors. The acoustic models were trained on 140 hours of Hub4 Broadcast News speech data and consist of 11 k HMM states and 134 k Gaussians. The language model is a pruned backoff trigram model trained on a mixture of Hub4 data and the NAB corpus. The vocabulary of the system contains over 210 k words.

Figure 1:
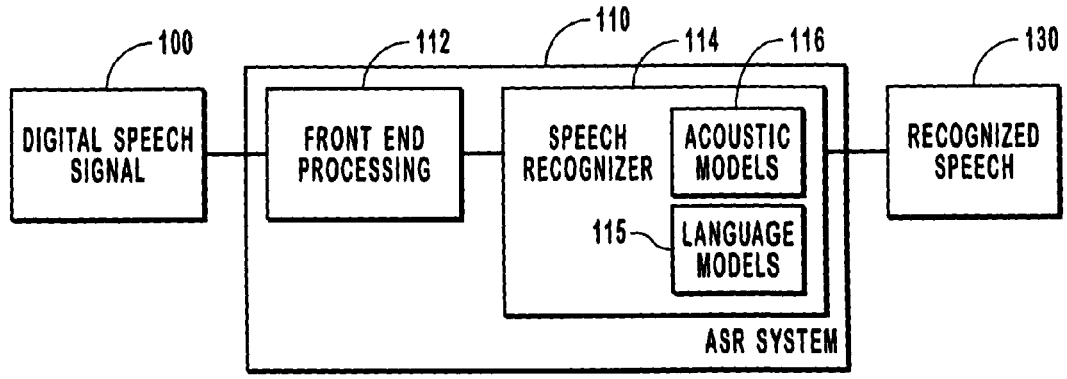
FIG. 1 illustrates an exemplary automatic speech recognition system including a front-end processing module and a speech recognizer that may be used to automatically transcribe speech.

FIG. 1 is a block diagram illustrating an exemplary ASR system for implementing embodiments of the present invention. The ASR system 110 receives a digital speech signal 100. As previously described, the digital speech signal 100 was generated from speech. After decoding or processing the digital speech 100, the ASR system 110 produces the recognized speech 130. In automatic speech recognition, decoding is often performed using certain features or attributes of the digital speech signal 100. The process of extracting the features is often referred to as feature extraction or front-end processing.

In a front-end processing module 112, the necessary features are extracted from the digital speech signal 100. After the features have been generated or extracted by the front-end processing module 112, the speech recognizer 114 uses the features to decode and recognize the speech.

The speech recognizer 114 often employs acoustic models 116. The acoustic models 116, for example, have a structure or format that is similar to the features or feature vectors produced by the front-end processing module 112. In other words, the acoustic models 116 contain example feature vectors that are used to help recognize the features or feature vectors extracted from the digital speech signal 100. The speech recognizer 114 also employs a language model 115. The language model 115 is typically used to help predict word sequences or the likelihood of a particular combination of words.

Discriminative Front-End Processing

Figure 2:
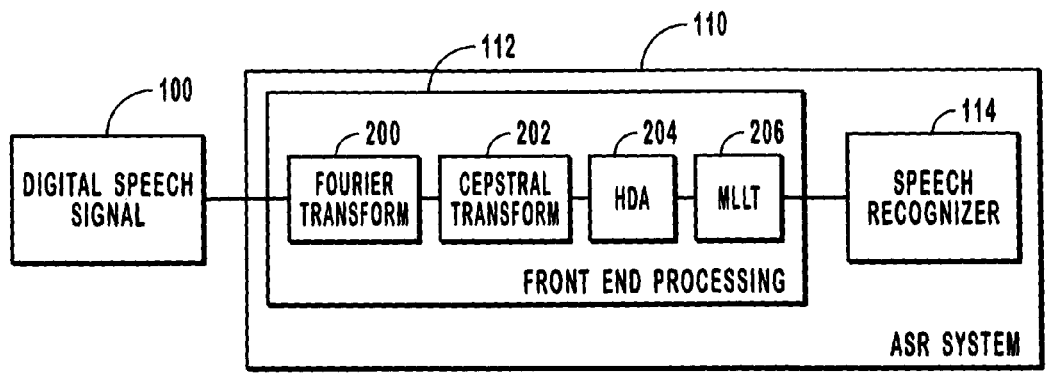
FIG. 2 illustrates a more detailed block diagram of the front-end processing performed on a digital speech signal.

FIG. 2 illustrates an example of front-end processing or feature extraction in accordance with the present invention. Discriminative front-end processing improves the accuracy of the features or feature vectors that are extracted from the digital speech signal 100. The front-end processing module 112 generates or produces the features or feature vectors that are needed by the speech recognizer 114 to recognize the speech contained in the speech signal 100.

In FIG. 2, the digital speech signal 100 is received by the front-end processing module 112 of the ASR system 110. The front-end processing module 112 performs a Fourier transform 200 on the digital speech signal 100. The Fourier transform 200 converts a signal from a time domain to a frequency domain. A cepstral transform 202 is applied to the output of the Fourier transform 200 and is used to obtain further data relating to the features of the speech signal. A cepstrum computes an Inverse Fourier transform of the log-spectrum of the speech signal. This is useful because the human auditory system is similar to a logarithmic scale in some frequencies.

More specifically, the mel frequency cepstrum coefficients and frame energy, with first and second order time derivatives (mfc-dd), are widely used front-end features that are obtained from the cepstral transform 202. It is useful to conceptualize the mfc-dd vector as a linear transformation of a measurement vector, assembled by concatenating a number of consecutive cepstrum and energy vectors, as needed for estimation of the derivatives.

In order to obtain more accurate features or feature vectors, a heteroscedastic discriminant analysis (HDA) transform 204 is applied to the output of the cepstral transform 202. Assuming a number of recognition classes with arbitrary Gaussian distributions, the HDA transform 204 provides feature or feature vectors that maximize a ratio of between-class and within-class distortion measures. Next, a maximum likelihood linear (MLLT) transform 206 is performed to ensure minimum loss of likelihood with diagonal covariance HMM.

MLLT transforms are more fully discussed in the following references, which are hereby incorporated by reference: G. Saon, M. Padmanabhan, R. Gopinath, and S. Chen, "Maximum Likelihood Discriminant Feature Spaces," in *Proc. ICASSP*, 2000, pp. 1129-1132; R. A. Gopinath, "Maximum Likelihood Modeling with Gaussian Distributions for Classifications," in *Proc. ICASSP*, 1998, pp. 661-664; and M. J. F. Gales, "Maximum Likelihood Linear Transformations for HMM-based Speech Recognition," Tech. Rep. CUED/FIN-FENG/TR291, Cambridge Univ., 1997.

Figure 4:
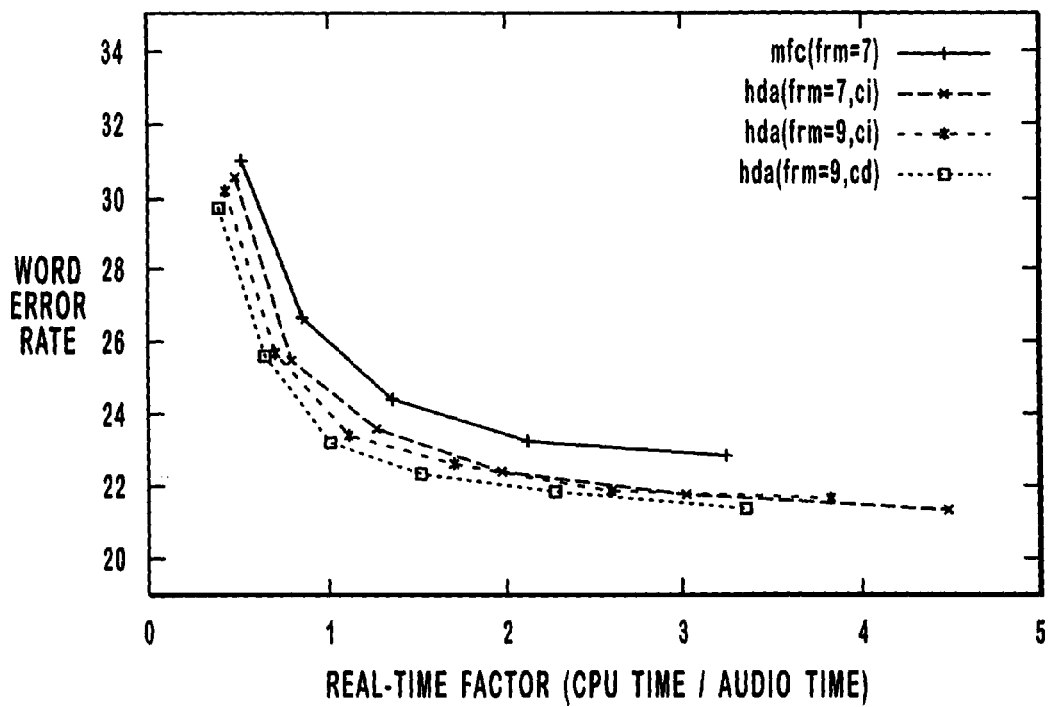
FIG. 4 illustrates the reduced word error rates achieved using both heteroscedastic discriminant analysis and maximum likelihood linear transform during front-end processing of the digital speech signal.

Applying the discriminative front-end processing to the baseline system, FIG. 4 illustrates exemplary results, which are presented as word error rate versus real-time factor plots obtained by varying the decoder beam. In this example, the Hub4e98 test set was used for evaluations.

FIG. 4 thus illustrates: (a) the advantage of using an HDA transform and a MLLT transform (HDA+MLTT) over standard mfc-dd features, (b) the choice of the number of consecutive cepstrum vectors that are input to the HDA transform, (c) the choice of "recognition class" for HDA+MLLT estimation and (d) the choice of the number of HDA+MLLT features to use.

FIG. 4 illustrates results using 12 cepstrum coefficients and energy for every speech frame and feature vectors of 39 dimensions for both mfc-dd and HDA+MLLT features. The results are shown with either seven or nine consecutive cepstrum and energy vectors as input to the HDA+MLLT transform, and either context-independent (ci) or context-dependent states (cd) as classes for HDA+MLLT estimation.

In one embodiment, standard mfc-dd uses seven consecutive frames to estimate the derivative components. Therefore, curves mfc-dd(form=7) and HDA(for m=7,ci) show the advantage of HDA+MLLT over standard mfc-dd under comparable conditions. The error rate is reduced further, and the recognition speed is improved, using nine consecutive frames (curve hda(form=9,ci)) and context-dependent states for HDA+MLLT transform estimation (curve hda(form=9,cd)).

In another example, more than 39 HDA+MLLT features were tried (not shown in FIG. 4). Going to 60 features helps the asymptotic performance (0.5% absolute improvement); but for speeds faster than 15×RT, 39 features give the best accuracy. The front-end processing module 112 increases the accuracy of the ASR system 110.

Discriminative Acoustic Models

Figure 3:
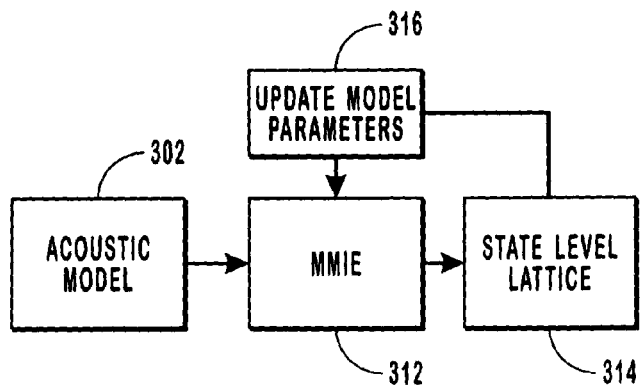
FIG. 3 is a block diagram illustrating a discriminative acoustic model.

As shown in FIG. 1, the speech recognizer 114 utilizes or applies acoustic models 116 to recognize speech from the feature vectors generated by the front-end processing module 112. FIG. 3 is a block diagram that illustrates discriminative acoustic models. In FIG. 3, Maximum Mutual Information Estimation (MMIE) 312 is applied to an acoustic model 302 (such as a hidden Markov model). The application of MMIE 312 to the acoustic model 302 results in a state level lattice 314. Next, the Gaussian means and variances of the state level lattice 314 are updated (316) and the MMIE 312 is applied to the resulting lattice. This process is repeated iteratively.

Lattice-based MMIE has been shown to be effective in large-vocabulary continuous speech recognition tasks such as North American Business News (NAB) and Switchboard. Those efforts, however, collect the necessary statistics by generating a phone-marked lattice once and performing a full forward-backward search on these lattices for each iteration. In contrast, the present invention generates, for each iteration, state-level lattices from the word lattices and performs a search constrained by these state-level lattices. In one example, the training typically requires 0.4×RT per iteration on Intel Pentium PIII running at 1 GHz.

Figure 5:
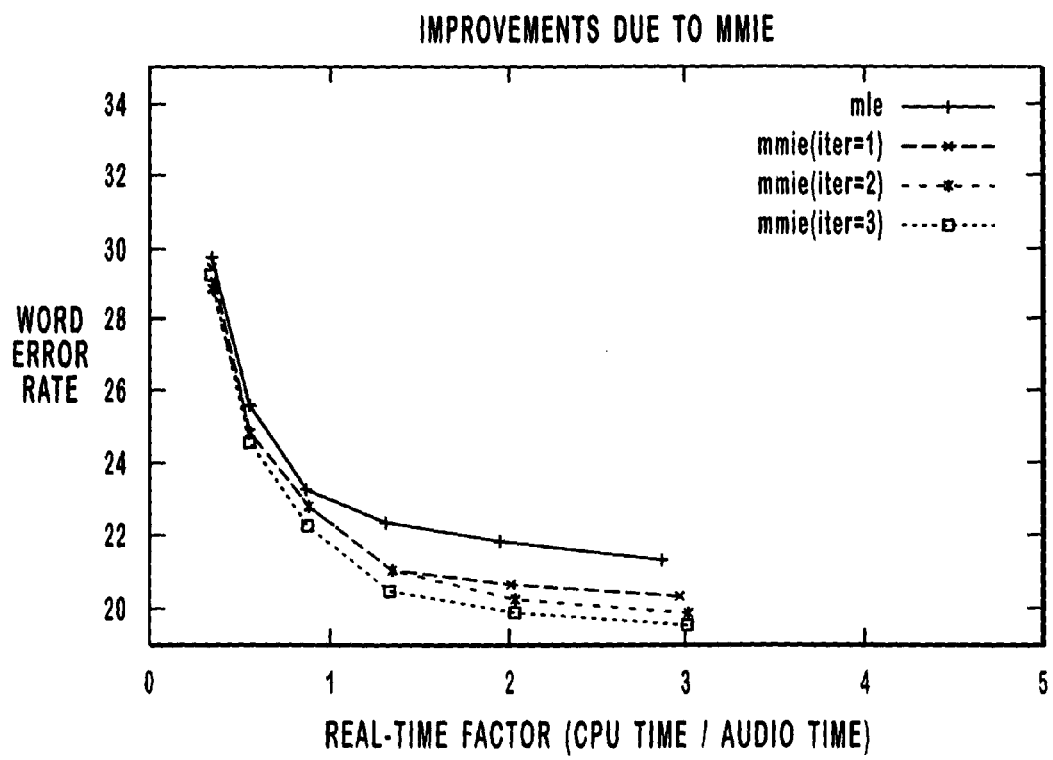
FIG. 5 illustrates the reduced word error rates achieved due to multiple iterations of maximum mutual information estimation.

FIG. 5 represents results for multiple iterations of MMIE training beginning with an MLE trained model. At each iteration, only the gaussian means and variances are updated. The gain from MMIE is larger at higher beams, but a significant gain can also be observed, as iterations progress, at lower beams.

Efficiency Improvements

Computation time in speech recognition is usually divided between the traversal of the recognition search space and the acoustic model likelihood calculation. The search space can be optimized using known methods. However, the following section describes systems and methods for determining or computing the acoustic model likelihoods by computing requested Gaussians for future speech frames in the context of receiving and processing real-time speech.

The computation of the (negative) log likelihood of the j-th diagonal Gaussian $N(\vec{\mu}_j, \vec{\sigma}_j)$ has the form:

$$-\log P_j = k_j + \sum_{i=1}^{N} \frac{(x_i - \mu_{ij})^2}{2\sigma_{ij}^2} \quad (1)$$

where N is the dimension of the acoustic feature vector. For moderate search beams, between 10% to 20% of the 134 k Gaussians, in one embodiment, need to be calculated for each frame. Profiling shows that much of the time spent in computing Equation (1) is not in the floating point operations, but in fetching the model data from main memory to the Level 2 cache. This is because the combined model and search space references per frame overflow the Level 2 cache. To ameliorate this problem, the present invention includes a likelihood batch strategy that computes and stores a requested Gaussian likelihood not just for the current frame, but for K−1 future frames as well. In one embodiment, K=8. This is beneficial because each Gaussian's parameters only have to be fetched once per batch and because most of the future likelihoods will be needed due to the continued activation of the corresponding search state (greater than 75% will be needed at moderate beams). An added advantage of batching the likelihoods is that the compiler can pipeline the computation and pre-fetch the data.

One alternative of equation (1) is to write the likelihood 'inner loop' in assembly language. Alternatively, the Basic Linear Algebra Subprogram Library (BLAS) can be used. The BLAS library is the computation kernel of the LinPack and LaPack linear algebra libraries and there exist highly optimized versions of BLAS for a variety of architectures. The computation in Equation (1) is not a BLAS library routine. However, we can recast Equation (1) as:

$$-\log P_j = \sum_{i=1}^{2N+1} a_{ij} y_i \quad (2)$$

where $y=(\vec{1}, x_1, x_2, \ldots, x_N, x_1^2, x_N^2)$ and are the coefficients in the quadratic expansion of Equation (1). The dot product is a component of BLAS. Because all the M (e.g., 12) Gaussians are computed in a mixture and the K frames are computed in a batch, the computation in Equation 2 for all these likelihoods becomes the product of an M×N' matrix with an N'×K matrix, wherein N' equals 2N+1 features. Matrix multiplication is a central component of the BLAS library.

In the following table, two different Intel Linux BLAS libraries are compared in the likelihood computation—one optimized for the Pentium II architecture and a second with Pentium III enhancements.

| Method | X Real-Time |
|---|---|
| Baseline | 3.12 |
| Batch (K = 8) | 2.08 |
| P2 BLAS | 1.87 |
| P3 BLAS | 1.59 |

Latency Reduction

Using both discriminative front-end processing and discriminative modeling, a real-time system with an improved error rate is achieved. As previously indicated, however, real-time performance does not guarantee low latency. For example, if an ASR system has a preprocessing component that operates on the whole input, then the latency will be at least the length of the input, regardless of the ASR system speed.

The latency of the ASR system is defined, in one instance, as the time delay between the input and the output of the system. In this example, the latency is the time it takes for the ASR or transcription system to display a word that was spoken. The input is thus the speech or spoken word(s) and the output is the transcription or the recognized speech. Latency often has a fixed component due to the lookahead and a variable component due to the search.

The present invention also reduces latency of the systems using ASR. Most ASR systems typically use an acoustic segmenter (the CMU segmenter, for example) to process the audio input and generate small segments that are then fed into the front-end processing module. For example, the CMU segmenter (out-of-the-box) operates on full shows and its latency is therefore the length of the show. Alternatively, segmenters may use a distance metric between two adjacent speech windows to decide on a segment boundary; the latency is at least the window length, which is typically two to four seconds.

Figure 6:
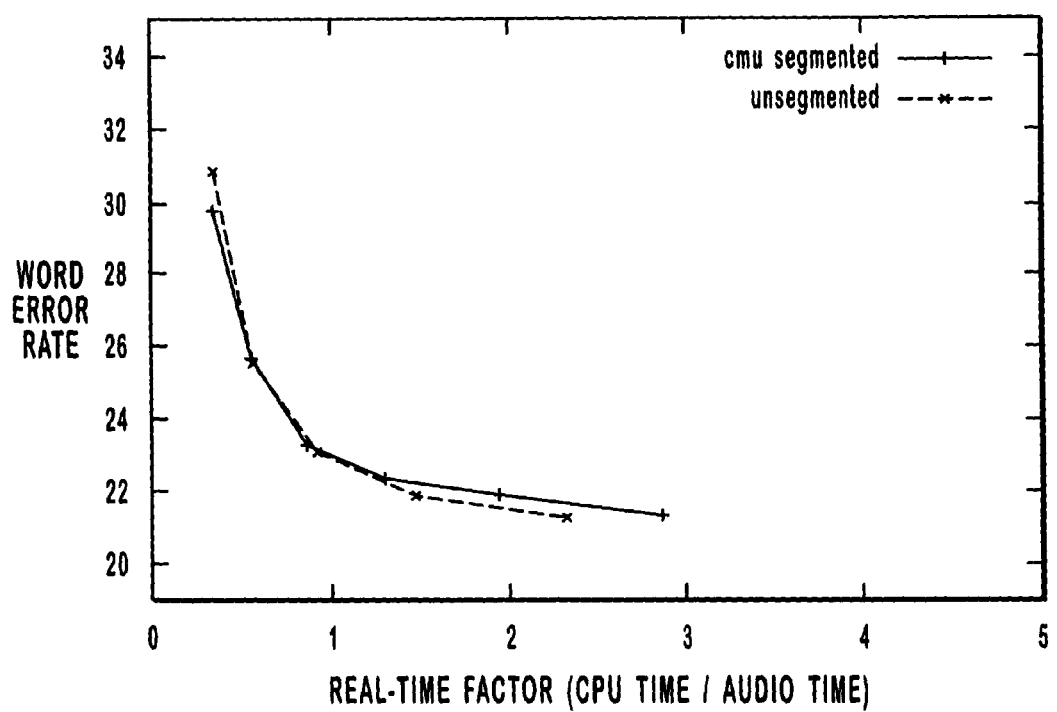
FIG. 6 compares word error rates between systems with and without an acoustic segmenter.

To avoid sentence segmentation latencies and errors, the recognition network or language model was replaced with its closure which permits the recognition of any number of sentences as a single input utterance, thus making end-pointing unnecessary. The closure of the recognition network is obtained, for instance, by adding an epsilon arc (a "free" transition) from a set of final states to the start state. In this manner a silence is not forced at segment boundaries. Alternatively, a penalty may be added to closure transitions. As illustrated in FIG. 6, this aspect of the present invention works as well as previous systems that use an acoustic segmenter.

The decoder was modified to give the common prefix of the hypotheses it is considering as a partial output, as soon as the common prefix is non-empty. This computation is done efficiently and occurs, in one embodiment, every 0.5 seconds. This avoids memory exhaustion by discarding the memory used for the prefix. In fact, after the modification, the system is able to run, in one embodiment, for a day on a continuous input stream with only a small increase in memory usage.

Another latency source is the front-end processing normalization. Most systems use per segment feature normalization, which increases the latency by the size of each segment, typically up to 30 to 60 seconds. The front-end processing normalization of the present invention works in a causal fashion except for a small look-ahead of 0.3 seconds. Finally, limiting the number of active arcs during decoding reduces the standard deviation of the real-time factor and hence reduces the latency.

ASR systems and other systems that utilize ASR have several sources of fixed latency. Most forms of fixed latency are in the form of lookahead. Another latency is the startup cost of loading the network and the acoustic models into memory. In one example, the front-end processing uses a 200 msec window for feature computation and a lookahead of 300 msec for feature normalization. The decoder has a lookahead of 7 frames (70 msec).

For the variable component of latency, two different quantities are usually relevant—computation delay and commitment delay. Computation delay is defined as the difference between the elapsed time and audio time measured at the end of each frame of audio or speech. Of course, since the audio or speech is input to the system in real-time, the computation delay can never be negative. The commitment delay is the duration of each partial output measured whenever the decoder has an output. Note that this number is shifted (on average by 0.25 sec) since the decoder can only produce a new output every 0.5 seconds.

Computation and commitment delays were measured on the Hub4e98 Test Set I. Although the maximum latency can be higher, 90% of the time the computation delay is under 0.22 seconds and the commitment delay is under 1.05 seconds, and 99% of the time the computation delay is under 0.93 seconds and the commitment delay is under 1.78 seconds. Since commitment delay is much larger than the computation delay, one embodiment of the present invention displays the best hypothesis so far at each frame, which is subject to change, until a partial hypothesis is committed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transcribing speech in real-time, the method comprising:

analyzing via a processor speech received in real-time using a discriminative front-end processing module, wherein the discriminative front-end processing module includes a heteroscedastic discriminant analysis and a maximum likelihood linear transform;

applying discriminative acoustic models to feature vectors produced by the discriminative front-end processing module;

requesting Gaussians calculated as Gaussian likelihoods from memory based on a current frame for a batch of frames that includes the current frame associated with a first time and a plurality of K future frames, the plurality of K future frames being associated with future speech not yet received, the future speech to be uttered at a second time which is later than the first time; and transcribing the speech recognized based on the discriminative acoustic models, wherein the future speech is recognized based at least in part on a Gaussian likelihood computed for the current frame.

2. A method as defined in claim 1, wherein analyzing the speech using a discriminative front-end processing module further comprises extracting feature vectors from the speech.

3. A method as defined in claim 1, further comprising recognizing speech from an output of the discriminative front-end processing module by generating additional state level lattices by iteratively applying maximum mutual information estimation to resulting state-level lattices.

4. A method as defined in claim 1, wherein applying discriminative acoustic models to feature vectors produced by the discriminative front-end processing module further comprises applying a language model wherein recognition networks of the language model have been replaced by their closure.

5. A method as defined in claim 4, wherein applying a language model wherein recognition networks of the language model have been replaced by their closure further comprises adding at least one of an epsilon transition, a silence transition, and a non-speech transition from a set of final states to a start state.

6. A method as defined in claim 4, wherein transcribing the speech recognized from the discriminative acoustic models further comprises:
outputting a common prefix when the common prefix is non-empty; and
discarding memory used for the common prefix in order to avoid memory exhaustion.

7. A method as defined in claim 1, wherein analyzing the speech using a discriminative front-end processing module further comprises performing front-end normalization in a low-latency fashion by reducing a lookahead of the discriminative front-end processing module.

8. A method as defined in claim 1, wherein there are M Gaussians in a mixture, K frames are in a batch and wherein the N features have been transformed into N' features where N' equals 2N+1, further comprising determining likelihoods by computing a product of an M×N' matrix with a N'×K matrix.

9. In a speech recognition system where computation time is divided between a traversal of a recognition search space and an acoustic model likelihood computation and wherein data for the acoustic model is retrieved from memory for each frame, a method for recognizing speech by reducing the computation time, the method comprising:
retrieving a batch of acoustic model data from main memory, wherein the batch corresponds to a current frame of real-time speech data associated with a first time and a plurality of K future frames of speech data, the K future frames being associated with future speech not yet received, the future speech to be uttered at a second time which is later than the first time;
computing a Gaussian likelihood for the current frame and Gaussian likelihoods for the plurality of K future frames using the batch of acoustic model data and based on the current frame;
storing the Gaussian likelihood for the current frame and the Gaussian likelihoods for the plurality of K future frames; and
recognizing and transcribing the future speech, when received, based at least in part on the Gaussian likelihood computed for the current frame.

10. A method as defined in claim 9, further comprising discarding Gaussian likelihoods that are not needed and retrieving a new batch of acoustic model data from main memory.

11. A method as defined in claim 9, further comprising pre-fetching the acoustic model data.

12. A method as defined in claim 9, wherein computing a Gaussian likelihood for the current frame and Gaussian likelihoods for the plurality of future frames further comprises computing a product of an M×N' matrix and an N'×K matrik, wherein N is a dimension of feature vectors, N' is a transform of N to 2N+1 features, M is a number of Gaussians in a mixture, and K is a number of frames in a batch.

* * * * *